Figure 2:
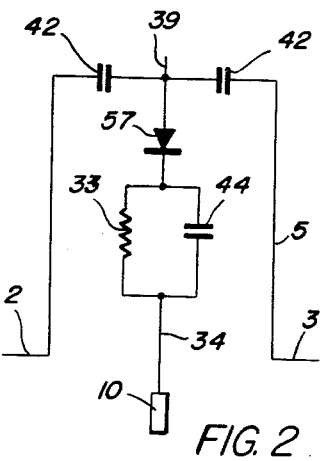

April 19, 1960     E. A. DORSETT     2,933,685

POWER MEASURING CIRCUIT

Filed Aug. 29, 1957

INVENTOR
EDWARD A. DORSETT

United States Patent Office 2,933,685
Patented Apr. 19, 1960

2,933,685

POWER MEASURING CIRCUIT

Edward A. Dorsett, Melbourne, Fla., assignor to Radiation, Inc., Melbourne, Fla., a corporation of Florida Application August 29, 1957, Serial No. 680,940

9 Claims. (Cl. 324—95)

The present invention relates to electrical power measuring apparatus and more particularly to electrical power measuring apparatus for measurement of electrical power dissipated in a load supplied with current at frequencies from direct current to 1200 megacycles per second.

In accordance with the present invention there is provided a short length of coaxial cable having a thin wall outer conductor and a solid cylindrical inner conductor. One end of the inner conductor terminates in a hollow cylindrical resistive element axially aligned with the solid conductor and coaxial with a thick wall outer conductor electrically connected to and integral with the thin wall outer conductor. The end of the hollow resistive element remote from the solid inner conductor is electrically connected to the thick wall outer conductor so that energy applied to the coaxial cable portion of the device is dissipated in the resistive element. Disposed internally of the hollow resistive element are the hot junctions of a plurality of series connected thermocouples. The cold junctions of the series are positioned so as to be subjected to the temperature of the thick wall portion of the apparatus. The thick wall portion of the apparatus due to its thermal inertia is relatively unaffected by thermal transients and is maintained substantially at the temperature of the ambient air so that the resultant voltage generated by the series connected thermocouples is proportional to the temperature due wholly to the electric power dissipated in the resistive element.

The thermocouples and the hollow resistor have substantial thermal inertia and in consequence there is a finite time-lag between a change in the power applied to the apparatus and the generation of a steady state voltage indicating the new value of power applied. In order to be able to indicate relative power level intervals when the thermocouples circuit is adjusting to new conditions, a secondary power measuring circuit is provided. Specifically, the voltage appearing at the junction of the solid center conductor and the resistive center conductor is measured by a resistor and junction diode connected in series to provide thereby a D.C. voltage which is proportional to the voltage across the resistive element and therefore the power dissipated therein. The D.C. voltage thus generated provides an instantaneous relative power indication which may be employed for adjusting the apparatus for optimum operation or other operations where relatively accurate power measurements may be employed as opposed to the high accuracy provided by the thermocouple measuring circuit.

It is an object of the present invention to provide an electrical power dissipating and measuring apparatus which may be employed at frequencies from direct current to ultra high frequencies.

It is another object of the present invention to provide an electric power dissipating and measuring assembly employing thermocouple elements for determining the power dissipated in a resistive element and further employing circuitry for detecting the voltage drop across the resistive element.

It is another object of the present invention to provide a power dissipating and measuring assembly employing a resistive center conductor and a thick wall hollow cylindrical outer conductor and employing appropriately interconnected thermocouples for measuring the difference in temperature between the resistive element and the thick wall outer conductor.

Figure 1:
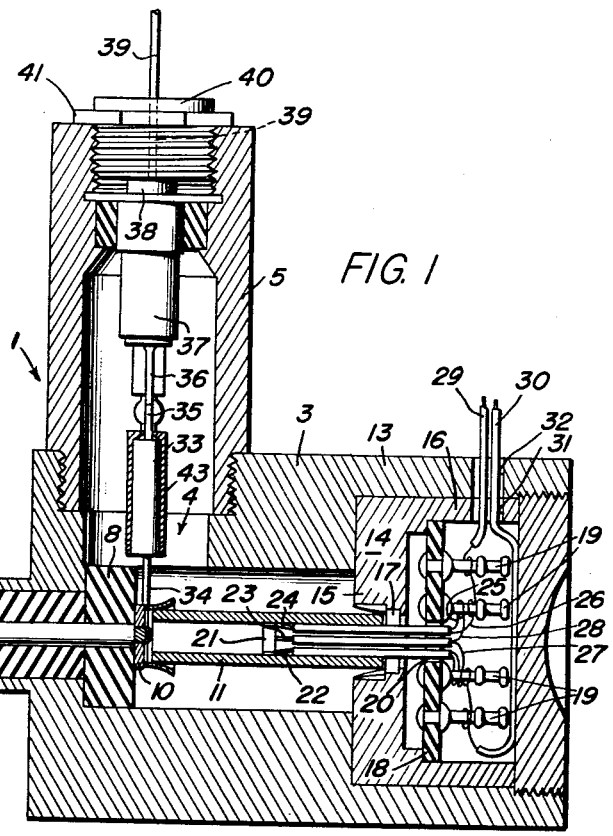

The above and still further objects, features and advantages of the present invention will become apparent upon consideration of the following detailed description of one specific embodiment thereof, especially when taken in conjunction with the accompanying drawings, wherein:

Figure 1 of the accompanying drawings is a cross-section of a vertical elevation of the physical embodiment of the apparatus of the present invention; and Figure 2 is a circuit diagram of the secondary voltage detector of the apparatus of the present invention.

Referring specifically to Figure 1 of the accompanying drawing, the termination and detector assembly of the present invention has a hollow cylindrical outer conductor 1 comprising a relatively thin wall section 2 axially aligned and integral with a hollow cylindrical thick wall section 3 of increased internal and external diameter. The thick wall section 3 is provided adjacent the intersection of the thin and thick wall portion 2 and 3, respectively, with a circular aperture 4 into which is threaded a hollow cylindrical conductor 5, the axis of which is perpendicular to and intersects the axis of the wall section 3. A solid cylindrical conductor 6 is disposed coaxial of the wall section 2 and extends into the central aperture of the hollow member 3 a distance sufficient to intersect the axis of the hollow conductor 5. The space between the conductors 2 and 6 is filled with a suitable dielectric material 7 such as Teflon and the portion of the center conductor 6 extending into the aperture of the hollow conductor 3 is supported in a dielectric disc 8. The end of the conductor 6 remote from the hollow conductor 3 contacts the center conductor, not illustrated, of a coaxial cable coupling connector 9, the outer conductor of which is electrically connected to the outer conductor 2. The other end of the conductor 6 is secured to a flat conductive disc 10 one surface of which abuts the insulating or dielectric disc 8. The conductive disc 10 contacts one end of a hollow resistive element 11 which is axially aligned with the conductor 6 and coaxial with the hollow cylindrical conductor 3, the conductor 11 being received in a spring type connector 12, secured to the disc 10. The portion of the hollow conductor 3 adjacent the end of the conductor 11 remote from the disc 10 is internally recessed to provide relatively thin walled portion 13 in which is disposed a cup-shaped member 14 having a flat disc shaped base 15 and an axially extending peripheral wall portion 16 in intimate contact with the inner surface of the wall portion 13. The disc-shaped base 15 is provided with a centrally disposed aperture 17 in which is positioned the end of the hollow resistive element 11 remote from the disc 10, the disc-shaped member 15 physically supporting the resistive element 11 and providing a low resistance conductive path between the element 11 and the wall 3. A circular disc 18 is disposed within the aperture provided by the peripheral wall 16 and is supported by and in good physical contact with the inner surface of the member 16. The disc 18 supports a plurality of metallic rods 19 which extend axially of the hollow conductor 3 and are arranged in a circle about the periphery of the disc 18 closely adjacent to the peripheral wall 16. The disc 18 has a central aperture 20 aligned with the center aperture of the hollow resistive element and is fabricated from a material which is a good electrical insulator, but a poor heat insulator so that the rods 19 are electrically insulated from one another and from the wall 16 of the member 14 but are subjected to the heat of the wall members 16 and 13.

Disposed within the hollow portion of the resistive element 11 is a disc 21 fabricated from the same material as the disc 18. Secured to transverse surface of the disc 21 are a plurality of the hot junctions of three thermocoupled elements 22, 23 and 24. The number of thermocoupled elements employed is a matter of choice, three such elements being illustrated merely for the purposes of explanation. The three thermocouples 22, 23 and 24 are connected in series so as to provide a plurality of cold junctions. More specifically, the thermocouple 24 is provided with a lead 25 of one metal and a lead 26 of a second metal. The thermocouple element 23 is provided with a lead 27 of the one metal and with a lead 28 of the second metal. The conductor 25 of the thermocouple 24 and a conductor 28 of the thermocouple 23, these two conductors being of different metals, are wrapped around one of the posts 19 and joined at their ends with the junction of the two wires contacting the post and forming a cold junction. The series circuit comprising the three thermocouples 22, 23 and 24 are provided with terminal leads 29 and 30 which are brought out through aligned apertures 31 and 32 in the walls 16 and 13 of the elements 14 and 3, respectively.

Disposed coaxially of the hollow cylindrical conductor 5 is a resistor 33 having a lead 34 connected to the metallic disc 10 and a lead 35 connected to a terminal 36 of a crystal diode 37 also disposed coaxially of the hollow cylindrical conductor 5. The crystal 37 has a second terminal 38 connected to an output lead 39 which passes through a metallic disc 40. The disc 40 is insulated from the outer conductor 5 by an annulus 41 of insulating material, the metallic disc 40, annulus 41 and end of conductor 5 providing a capacitive element which, in Figure 2 of the accompanying drawings, provides the capacitive element 42. The resistor 33 is provided with a hollow cylindrical metallic jacket 43 which provides a capacitor in shunt with the resistance 33, this capacitance bearing the reference numeral 44 in Figure 2 of the accompanying drawings.

The electrical energy supplied to the apparatus via coaxial coupler 9, is dissipated in the resistive element 11 which constitutes a load between the center conductor 6 and the outer conductor 1 via the conductive base 15 of the cup-shaped element 14. The power dissipated in the resistive element 11 generates heat proportional to the power dissipated and the hot junctions of the thermocouple elements 22, 23 and 24 are subsided to this heat while the cold junctions are in heat conductive relation with the thick outer wall 3 of the apparatus. In consequence the net output voltage produced across the terminal leads 29 and 30 of the series thermocouple circuit is proportional to the difference between the heat of the center conductor 11 and the outer conductor 3. The outer conductor 3 assumes the temperature of the surrounding air and being a substantially thick wall member of a high thermal inertia, it does not readily change its temperature with transient fluctuations in the external thermal conditions. In consequence, the voltage appearing across the leads 29 and 30 is proportional to the difference in heat between the element 11 and the surrounding atmosphere and therefore is proportional to the heat generated by the power dissipated in the element 11.

A measuring apparatus employing thermocouples is inherently slow in response due to thermal inertia of the various members of the system and as a result of the time required for the hot junctions of the thermocouples to heat to a new temperature. Therefore, a secondary method of relative power detection is provided to indicate relative power levels, during intervals of changing conditions, by sampling the voltage drop across the termination resistor 11. The sampling of the voltage drop across the termination resistor or resistive element 11 provides instantaneous relative power measurements which may be relied upon for quantitive indications such as maximizing or tuning operations. The circuitry employed to sense the voltage drop across the resistive element 11 includes the previously described resistor 33 and diode 37 in conjunction with by-pass capacitors 44 and 42. The voltage appearing at the disc 10 is applied via the resistor 33 to the crystal diode 37 where it is rectified and appears on the lead 39. The capacitors 42 and 44 are A.C. by-pass capacitors so that the voltage appearing at the output lead 39 is equal to the D.C. component of the rectified voltage and the A.C. component is shunted to the case ground, that is, outer conductor 5. Since the disc 10 is connected to the end of the resistive element 11, remote case ground and the voltage at the disc 10 is proportional to the power dissipated in the element 11, the voltage at the lead 39 provides an instantaneous indication of the power dissipated in the load and detector assembly.

The apparatus of the present invention may be employed at frequencies from D.C. to approximately a thousand megacycles per second. At the lower frequencies the inner and outer conductors 2, 3 and 6, 11 respectively, appear as any two conductors of a two wire system while at the high frequencies the inner and outer conductors provide the necessary wave guiding elements for propagation of energy at the higher frequencies.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A detector assembly comprising a section of coaxial cable having a center conductor and an outer conductor, a hollow cylindrical resistive element having a first end section and a second end section, said resistive element being aligned with and having said first end section electrically connected to said center conductor, a thick-walled, hollow cylindrical conductor coaxial wtih and surrounding said resistive element substantially throughout the length of said resistive element, conductive means electrically connecting said thick-walled conductor to said second end section of said resistive element, and means for measuring the difference in temperature between said thick-walled conductor and said resistive element.

2. A detector assembly comprising a section of coaxial cable having a center conductor and an outer conductor, a hollow cylindrical resistive element having a first and a second end segment, said resistive element being axially aligned with and having said first end segment electrically connected to said center conductor, a thermal shield for said resistive element including a thick-walled hollow cylindrical conductor coaxial with and surrounding said resistive element substantially over the length of said resistive element, conductive means electrically connecting said thick-walled conductor to said second end segment of said resistive element, means for producing a voltage proportional to the difference in temperatures of said thick-walled conductor and said resistive element, and means for measuring the voltage across said resistive element.

3. An electrical energy dissipating and power measuring apparatus, comprising a coaxial cable having a center conductor and an outer conductor, said center conductor including a conductive rod and a hollow cylindrical resistive element axially aligned therewith, said outer conductor including a thin-walled section adjacent said rod and a thick-walled section adjacent said resistive element, conductive means connecting a section of said resistive element remote from said conductive rod to said thick-walled section of said outer conductor, a plurality of thermocouples connected in series circuit to provide a plurality of hot junctions and cold junctions, means for subjecting said hot junctions to the heat of said resistive element and means for subjecting said cold junctions to the heat of said thick-walled section.

4. The combination in accordance with claim 3, wherein said means for subjecting said hot junctions to the heat of said resistive element comprises means for mounting said hot junctions within the hollow of said hollow element and in contact with the wall thereof.

5. The combination in accordance with claim 3, further comprising means for measuring the voltage drop across said resistive element.

6. The combination in accordance with claim 5, wherein said means for measuring comprises a rectifying circuit connected between an end of said resistive element adjacent said conductive rod and said outer conductor.

7. An electrical energy dissipating and power measuring apparatus, comprising a hollow cylindrical resistive element having a first end and a second end, a hollow thick-walled cylindrical conductor coaxial with and surrounding said resistive element substantially over the length of said resistive element, the thickness of the walls of said conductor being such as to impart a high thermal inertia thereto, conductor means for electrically connecting said first end of said resistive element to said conductor, means adapted to connect said conductor and said second end of said resistive element to a source of electrical energy and means for measuring the difference in temperature between said resistive element and said conductor.

8. The combination in accordance with claim 3, wherein said means for subjecting said hot junctions to the heat of said resistive element comprises means for mounting said hot junctions within the hollow of said hollow element.

9. The combination according to claim 3 wherein said means for subjecting said cold junctions to the heat of said thick-walled section comprises, an electrically nonconductive platform having good heat-conducting properties supported by said thick-walled section, a plurality of metal parts supported by said platform, said cold junctions of said thermocouples contacting said posts.

References Cited in the file of this patent

UNITED STATES PATENTS

| | | |
|---|---|---|
| 2,398,606 | Wang | Apr. 16, 1946 |
| 2,427,094 | Evans | Sept. 9, 1947 |
| 2,443,637 | Overbo | June 22, 1948 |
| 2,464,277 | Webber | Mar. 15, 1949 |
| 2,473,495 | Webber | June 14, 1949 |
| 2,495,733 | Kandoian | Jan. 31, 1950 |
| 2,575,799 | Doherty | Nov. 20, 1951 |
| 2,617,843 | Houghton | Nov. 11, 1952 |